United States Patent
Ron et al.

(10) Patent No.: US 10,534,449 B2
(45) Date of Patent: Jan. 14, 2020

(54) ADJUSTABLE DIGITAL ERASER

(71) Applicant: Microsoft Technology Licensing, LLC, Redmond, WA (US)

(72) Inventors: Uri Ron, Kfar-Saba (IL); Eliyahu Barel, Beit Ariye (IL); On Haran, Kfar-Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 26 days.

(21) Appl. No.: 15/242,392

(22) Filed: Aug. 19, 2016

(65) Prior Publication Data
US 2018/0052534 A1    Feb. 22, 2018

(51) Int. Cl.
G06F 3/0354    (2013.01)
G06T 11/60    (2006.01)
G06F 3/0484    (2013.01)

(52) U.S. Cl.
CPC ...... *G06F 3/03545* (2013.01); *G06F 3/04847* (2013.01); *G06T 11/60* (2013.01)

(58) Field of Classification Search
None
See application file for complete search history.

(56) References Cited

U.S. PATENT DOCUMENTS

| | | |
|---|---|---|
| 5,475,401 A | 12/1995 | Verrier et al. |
| 5,793,360 A | 8/1998 | Fleck et al. |
| 6,104,350 A * | 8/2000 | Ng ............ H01Q 1/245 343/702 |
| 6,850,230 B1 | 2/2005 | Vincent et al. |
| 7,292,229 B2 | 11/2007 | Morag et al. |
| 8,243,028 B2 | 8/2012 | Hildebrandt et al. |
| 8,988,398 B2 | 3/2015 | Cao et al. |
| 9,176,604 B2 | 11/2015 | Krah et al. |
| 9,213,424 B1 * | 12/2015 | Dunn ............ G06F 3/03545 |
| 9,250,721 B2 | 2/2016 | Mkrtchyan et al. |

(Continued)

FOREIGN PATENT DOCUMENTS

EP    2555087 A1    2/2013

OTHER PUBLICATIONS

"Vectips", Published on: Aug. 19, 2008 Available at: http://vectips.com/tips/wacom-settings-in-illustrator/.

(Continued)

*Primary Examiner* — Bryan Earles
(74) *Attorney, Agent, or Firm* — Arent Fox LLP (57) ABSTRACT

The structure and devices described herein provide an improved digital eraser for a stylus. A stylus may have an eraser end that transmits an erase signal from an eraser antenna. A cover houses the eraser antenna and can be configured with varying geometry to selectively position the eraser antenna closer to, or further away from, a digitizer screen of a computing device when the cover is in contact with the digitizer screen. The computing device can detect the signal strength of the erase signal and/or the contact area between the cover and the digitizer screen and vary one or more of the width, area, or opacity of the erase function. The computing device can further, based upon the strength of the signal and/or the contact area between the cover and the digitizer screen, determine the tilt and/or the rotation of the stylus.

20 Claims, 8 Drawing Sheets

(56) References Cited

U.S. PATENT DOCUMENTS

| | | | |
|---|---|---|---|
| 2007/0176904 A1 | 8/2007 | Russo | |
| 2007/0285405 A1 | 12/2007 | Rehm | |
| 2009/0153525 A1 | 6/2009 | Chang | |
| 2010/0181121 A1 | 7/2010 | Tremblay | |
| 2012/0293425 A1* | 11/2012 | Lee | G06F 3/03545 345/173 |
| 2012/0331546 A1 | 12/2012 | Falkenburg et al. | |
| 2013/0088465 A1 | 4/2013 | Geller et al. | |
| 2013/0257777 A1 | 10/2013 | Benko et al. | |
| 2014/0354600 A1 | 12/2014 | Kuwata | |
| 2015/0029161 A1* | 1/2015 | Koo | B43K 29/00 345/179 |
| 2015/0116291 A1* | 4/2015 | Leung | G06F 3/03545 345/179 |
| 2015/0123923 A1 | 5/2015 | Stern | |
| 2015/0212601 A1* | 7/2015 | Zerayohannes | G06F 3/03545 345/179 |
| 2015/0363013 A1* | 12/2015 | Coutts | G06F 3/03545 345/179 |
| 2016/0364027 A1* | 12/2016 | Bernstein | G06F 3/03545 |
| 2017/0010697 A1* | 1/2017 | Jiang | G06F 3/033 |

OTHER PUBLICATIONS

"International Search Report and Written Opinion Issued in PCT Application No. PCT/US2017/046674", dated Nov. 21, 2017, 14 Pages.

\* cited by examiner

ADJUSTABLE DIGITAL ERASER

BACKGROUND

Personal computers utilize various mechanisms for receiving input. For example, many personal computers allow a keyboard, a mouse, a touchpad, or other such devices to provide input to the personal computer. Mobile personal computers, such as tablets, smart phones, laptops, and even many non-mobile computers, may incorporate a touch-screen that can receive input directly through contact, or near-contact, with the screen.

A stylus is one preferred implement for inputting information into a computer through the touch-screen. A stylus is typically shaped like a pen or a pencil and has a writing end designed for entering information, such as handwritten text or drawings, and a tail end that may function as an eraser to remove information from the touch-screen. However, the erase signal output from a stylus does not provide for a high degree of fineness, such as the ability to vary the size of the erased area or the ability to control the opacity of the erased area.

SUMMARY

The systems, methods, and techniques described herein provide for an improved stylus incorporating a tail end having a digital eraser that outputs an erasing signal from an antenna positioned within the tail end. In some instances, the digital eraser is asymmetrical about a longitudinal axis of the stylus such that, depending on the rotation of the stylus or the tilt of the stylus with respect to a touch-screen, the antenna may be closer to, or further away from, the digitizing surface of a computing device when the digital eraser is in contact with the digitizing surface.

Consequently, the change in distance between the eraser antenna and the digitizing surface affects a change to the erase signal that is received by the computing device. The computing device can detect the change in signal due to the varying distance of the eraser antenna from the digitizing surface and can make adjustments to its response to the erase signal.

Further, the digitizing surface may detect the surface area of the digital eraser that is in contact with the digitizing surface and the computing device may make further adjustments to the response to the erase signal accordingly. For example, where there is relatively small surface contact between the digital eraser and the digitizing surface, the size of the erased portion may be very fine, such as erasing individual pixels. Similarly, where there is a relatively large area of surface contact between the digital eraser and the digitizing surface, the computing device may respond to the erase signal with a stroke erase function.

In addition, the strength of the erase signal in combination with the surface area contact between the digital eraser and the digitizing surface can be used to determine a degree of tilt of the stylus relative to the digitizing surface. The degree of tilt may further be used by the computing device to adjust its response to the erase signal emitted from the tail end of the stylus.

Consequently, the computing device may be able to determine the tilt angle of the stylus with respect to the digitizing surface, the rotational orientation of the stylus about its own axis, and adjust the fineness and/or the opacity of the erase function based upon a single erase signal emitted from a single eraser antenna within the tail end of the stylus.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

FIG. 2b is an illustration of the surface contact between the digital eraser and the digitizer screen of FIG. 2a.

FIG. 3b is an illustration of the surface contact between the digital eraser and the digitizer screen of FIG. 3a.

FIG. 7b is an illustration of the surface contact between the digital eraser and the digitizer screen of FIG. 7a.

FIG. 7c is an elevational simplified schematic diagram of the tail end of the stylus of FIG. 7a.

FIG. 7e is an elevational simplified schematic diagram of the tail end of the stylus of FIG. 7a.

FIG. 8b is a top plan view of the tail end of the stylus of FIG. 8a.

FIG. 9b is a top plan view of the tail end of the stylus of FIG. 9a

FIG. 10b is a top plan view of the tail end of the stylus of FIG. 10a

DETAILED DESCRIPTION

A stylus is a writing instrument designed to be used with a computing device to enter input to the computing device in the form of written text and images. More specifically, a stylus communicates with a computing device both through physical contact with a touch-screen of the computing device as well as sending wireless signals to the computing device. A stylus is a relatively small accessory with limited interior space to house a power system, a processing system, and a communication system, so there is limited opportunity to build additional features or functionality into a stylus.

However, a stylus and computing device can be configured to cooperate to provide additional functionality from the stylus with minimal changes to the stylus and/or the computing device. For instance, the tail end of the stylus may be outfitted with a digital eraser. The digital eraser may have a cover formed of an electrically conductive material such as a conductive rubber, a plastic or plastic alloy, or some other suitable material that houses an eraser transmitter in close proximity. In other implementations, the cover is formed of a dielectric material, such as, for example, plastic or rubber. When the digital eraser touches the screen of the computing device, the computing device senses both the physical touch of the digital eraser and the signal emitted from the eraser transmitter.

The signal emitted from the eraser transmitter varies in strength depending on distance and obstacles between the transmitter and the sensor. Hence, by configuring the digital eraser with a cover having various geometries, when the digital eraser is in contact with the screen of the computing device, the transmitter may be positioned at various distances from the screen, and thereby vary the signal strength received by the computing device from the eraser transmitter. As a result, the computing device can take various actions based upon the signal strength. For instance, as one example, where the signal emitted from the eraser transmitter is relatively strong compared to a baseline signal, the computing device may interpret the touch input from the digital eraser as a stroke erase. In other words, the computing device will interpret the touch input from the digital eraser as a broad stroke that will change the pixel color values located within an erasing area to have the same color value as the background pixel colors.

In another instance, where the signal emitted from the eraser transmitter is relatively weak compared to a baseline signal, the computing device may interpret the touch input from the digital eraser as a pixel eraser. That is, the fineness of the eraser will be increased (e.g., the area to be erased is reduced) to allow the stylus to input an erase command to the computing device with a high level of precision.

In addition to evaluating the signal strength of the erase signal, the computing device may also analyze the touch input from the digital eraser. A computing device may have a touch-screen incorporating a digitizer, such as a capacitive inductance digitizer ("digitizer screen"), that can detect a location at which the stylus makes contact. In addition, the digitizer screen may additionally detect the surface area of contact between the digital eraser and the digitizer screen. The computing device may additionally use the contact area as an input in determining the fineness of the erase function. In other words, where there is a relatively small surface contact between the digital eraser and the digitizer screen, the area to be erased is reduced when compared to an instance where there is a relatively large surface contact between the digital eraser and the digitizer screen.

Thus, the digital eraser may indicate a location on the digitizer screen to perform an erase function, the computing device will detect the erase signal emitted from the erase antenna of the stylus, and will further detect the strength of the erase signal and/or the surface area of contact between the digital eraser and the digitizer screen and erase information from the digitizer screen accordingly.

A stylus may be designed to mimic the look and feel of a pen or pencil—devices that many users are familiar with. As such, the use of a stylus, in many instances, is designed to mimic the use of a pen or pencil. Accordingly, for convenience in understanding the ensuing description, the use of a stylus to enter and erase digital information entered into a computing device, will be referred to as "writing" and "erasing." Accordingly, the use of the term "digital ink" refers to the display of information on a screen of a computing device and may include text or images entered into the computing device via a touch-screen by a stylus. A "stroke erase" refers to erasing multiple pixels of information in a path that the digital eraser takes across the digitizer screen. A "pixel erase" refers to the fineness of the erase function, e.g., being able to erase single pixels along a path that the digital eraser defines across the digitizer screen. The area to be erased, whether a stroke erase or a pixel erase, may be referred to as the erase area, and it may coincide with the area of contact between the digital eraser and the digitizer screen as the digital eraser moves across the digitizer screen. Based upon the foregoing description, the erase function may be thought of as being able to erase digital ink through broad strokes or fine strokes, and any weight of stroke in between.

Figure 1:
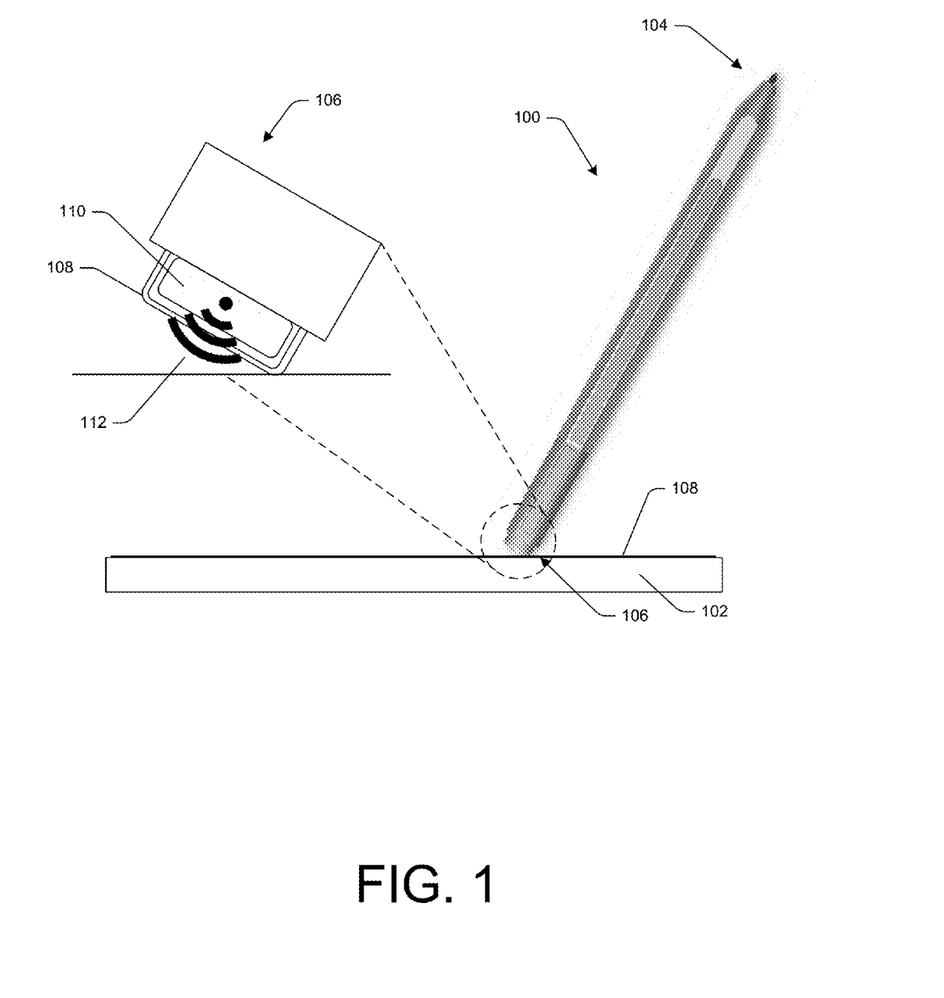
FIG. 1 is an illustration of one example of a stylus incorporating an eraser antenna within a digital eraser of a stylus.

With reference to FIG. 1, a stylus 100 works in conjunction with a computing device 102 to allow precise input on a touch-screen of the computing device. The stylus 100 typically has a barrel that forms a writing end 104 and a tail end 106. The writing end 104 may be configured with any manner of tip for cooperating with the touch-screen to enable a user to input information to the computing device with the stylus 100. A stylus 100 may be configured to input text similar to using a pencil or a pen on paper, or the stylus 100 may be configured to function as a brush, crayon, marker, charcoal, or some other type of device for inputting information into the computing device as could be applied to paper or canvas.

The computing device 102 configured to accept input from a stylus will typically include a touch-screen 108, and in many cases, includes a capacitive inductance touch-screen that is able to detect a point on the screen where the stylus 100 makes contact with the screen 108, and may also be able to detect the position of the stylus 100 when it is in close proximity to the touch-screen 108. As used herein, when referring to the use of a stylus to input information to a computing device, the terms "screen," "touch-screen," and "digitizer screen" may be used interchangeably. The touch-screen 108 may also be configured to detect pressure applied by the stylus 100, and in some cases, the stylus 100 will detect pressure exerted against the touch-screen, such as through pressure sensors positioned in the writing end 104 and/or the tail end 106, and send data to the computing device 102 indicating the pressure at which the stylus 100 is being pressed against the touch-screen 108.

The computing device 102 may be any type of computing device that may be configured with a screen for receiving input from a stylus 100. Suitable types of computing devices 102 may include a desktop computer, a laptop computer, a smartphone, a tablet computer, a gaming console, a television, or some other computing device 102 that is capable of being operated as described herein.

As illustrated, the stylus 100 has a barrel 104 that is generally an elongate member having any suitable cross sectional shape. In many implementations, the stylus 100 includes a hollow elongate barrel and is configured to resemble a pen or pencil and may have a cross-sectional shape that resembles a circle, hexagon, octagon, or some other shape that allows the stylus 100 to be used in the manner it is designed for.

The tail end 106 may include a cover 108, which may be formed of a dielectric material, such as a rubber, any suitable metal or metal alloy, a plastic material, a composite material, or any combination of materials. In some examples, an eraser antenna 110 is disposed within the tail end 108 and is protected by the cover 108. The eraser antenna 110, when active, emits an erase signal 112. The eraser antenna 110 is a transmitter that emits a wireless signal, and the terms antenna and transmitter may be used interchangeably herein.

It should be appreciated that, while the present disclosure and figures are focused on a tail eraser that emits an erase signal, the concepts provided herein could equally apply to a different type of input device, and could be used in the manner described herein to mimic the effects of a marker, paint brush, crayon, charcoal, or some other medium as applied to paper or canvas. For example, while the disclosure describes a digital eraser providing multiple levels of fineness with respect to the erase command, the same could be applied to a stylus that mimics another artistic medium by varying the fineness of the brush or applicator used to enter digital ink into the computing device 102. Alternatively, the erase signal could be changed or replaced with an inking signal and the tail end 108 could be used to initiate an inking function to enter text or images into the computing device.

Figure 2A:
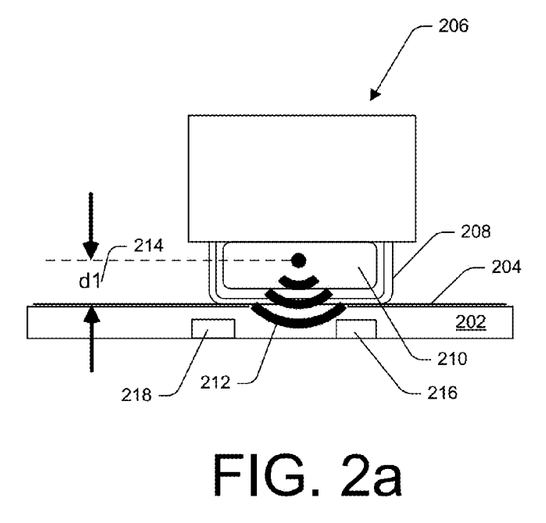
FIG. 2a is an elevational simplified schematic diagram of a tail end of a stylus.
Figure 2B:
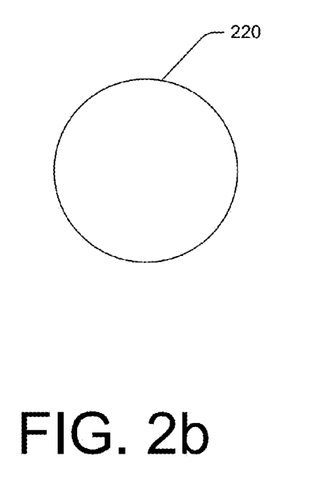

With reference to FIGS. 2a and 2b, the tail end 206 of an implementation of a digital eraser includes a cover 208 that has a generally circular cross section. An eraser antenna 210 is disposed within the cover and emits an erase signal 212. For ease in discussion, it will be assumed that the erase signal 212 emits from a point source located approximately at the center of the illustrated eraser antenna 210. Of course, the eraser antenna 210 could be formed in any suitable manner and in any desirable shape to provide the improvements described herein.

The eraser antenna 210 thus emits an erase signal 212 from a location that is spaced a distance d1 214 from the digitizer screen 204. The computing device 202 may be configured to detect the erase signal 212, and further, may be configured with a signal strength meter 216 to determine the strength of the erase signal 212. A microprocessor 218 in the computing device 202 may receive the output from the signal strength meter 216 to determine information about the stylus.

The erase signal 212 may be attenuated during transmission, that is, the signal strength may degrade, or be reduced, as it propagates through solids or gasses, and further attenuates at the interface between different materials. In many instances, the erase signal 212 is a low energy signal and may be electromagnetic, electrostatic, infrared, radio frequency, or some other type of wireless signal. Attenuation of a low energy signal may represent a greater percentage of the overall signal reduction than a high energy signal. That is, a small attenuation of a low energy signal is more dramatic than the same attenuation of a high energy signal.

The digitizer screen 204 may additionally detect the surface contact with the tail end 206. As illustrated in FIG. 2b, when the stylus is oriented substantially orthogonally to the plane of the digitizer screen 204 (as illustrated in FIG. 2a), the surface contact area 220 between the digital eraser and the digitizer screen 204 is circular shaped and the surface contact area 220 is maximized in those implementations in which the cover 208 on the tail end 206 defines a flat surface.

Figure 3A:
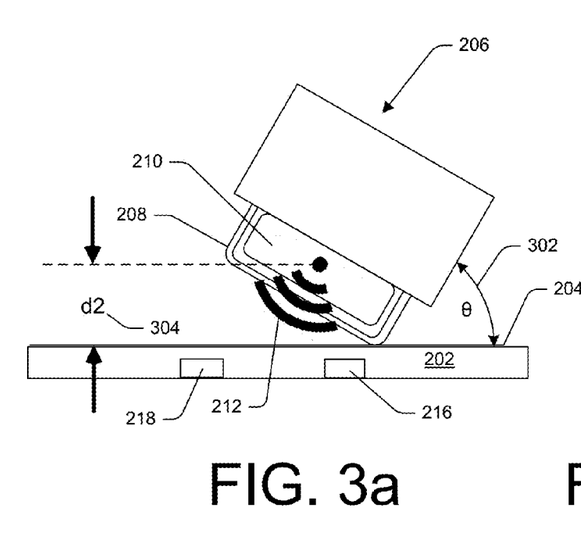
FIG. 3a is an elevational simplified schematic diagram of the tail end of the stylus of FIG. 2a illustrating the stylus at a tilt angle with respect to the digitizing surface.
Figure 3B:
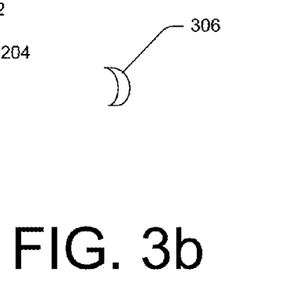

In contrast, FIGS. 3a and 3b show the tail end 206 of the stylus of FIG. 2a when tilted at an angle θ 302. In this orientation, the eraser antenna 210 emits an erase signal 212 from a location that is spaced a distance d2 304 from the digitizer screen 204, where d2 304 is greater than d1 214. The relationship between d1 214 and d2 304 can be determined by trigonometric identities and are a function of the cover 208 geometry, the angle θ 302, and the position of the antenna within the cover 208. The change in distance from d1 214 to d2 304 results in greater attenuation of the erase signal 212, which can be detected by the signal strength meter 216 of the computing device 202. The microcontroller 218 of the computing device 202 may then be able to determine the approximate angle of tilt θ 302 of the stylus.

As shown in FIG. 3b, when the stylus is tilted at an angle θ 302, the surface contact area 306 between the cover 208 and the digitizer screen 204 resembles a crescent, but perhaps more importantly, has a significantly smaller surface contact area 306 than when the stylus is oriented orthogonally to the digitizer screen 204 as shown in FIG. 2b. The digitizer screen 306 may additionally detect the surface contact area 306 and use that information to approximate the tilt θ 304 of the stylus. Moreover, when the stylus is tilted at an angle θ 302, the attenuated erase signal 212, the surface contact area 306, or both may be used by the computing device 202 to modify the erase function. For example, an erase function may be the result of the erase signal 212 and contact between the cover 208 and the digitizer screen 204. The computing device 202 may detect the erase signal 212 and contact between the cover 208 and the digitizer screen 204. The computing device 202 may then erase the information written on the screen as a result. However, where the stylus is tilted at an angle θ 302 and the surface contact area 306 is small, the computing device may enter a pixel erase mode in which the area to be erased is relatively small, such as approximately the same area as the surface contact area 306. Therefore, the digital eraser is able to closer resemble the use of a traditional eraser, that is, the digital eraser can erase the portions of digital ink that it comes in contact with based upon the surface contact area 306.

In some instances, the computing device 202 may determine the stylus tilt angle θ 302 and reduce the strength of the erase function accordingly, that is, rather than completely erasing the information on the digitizer screen 204, partially erase the information such as when a pencil is lightly applied to paper to only reduce the opacity of the information on the paper.

Figure 4:
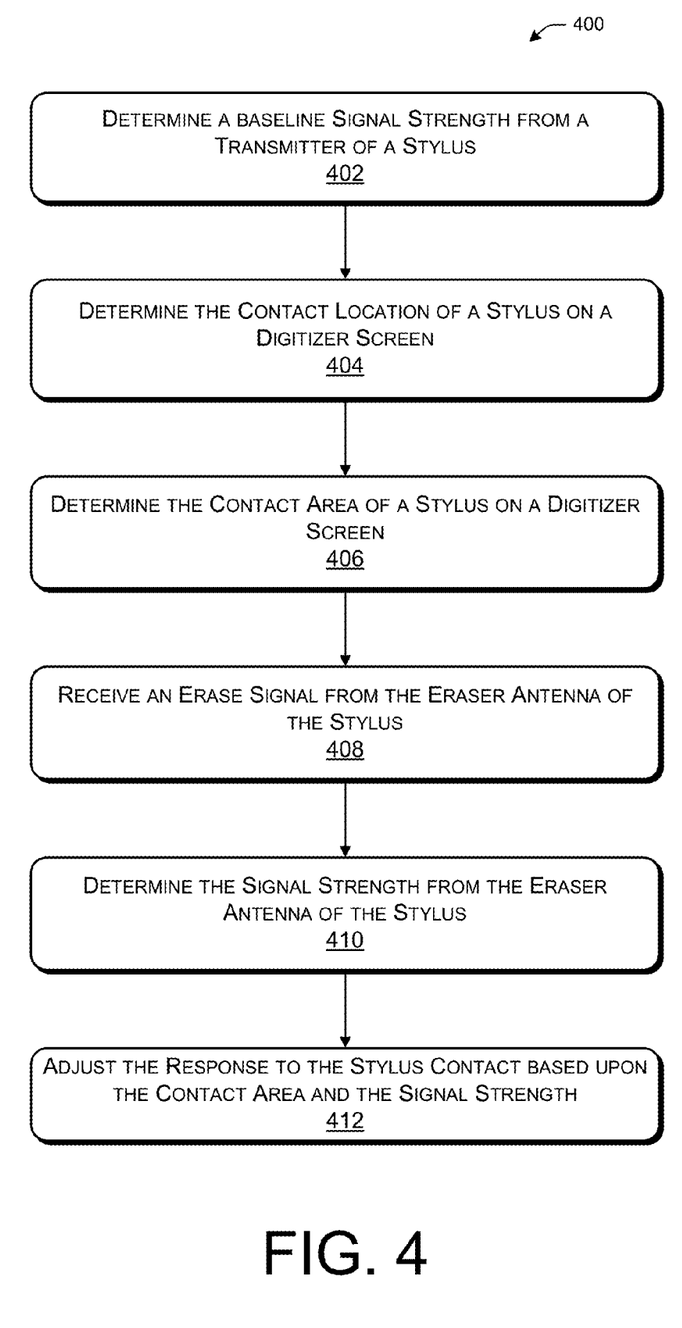
FIG. 4 is an example block diagram showing how the computing device can determine orientation of a stylus.

With reference to FIG. 4, a sample block diagram is illustrated to describe an example process 400 for receiving and interpreting an erase signal. At block 402, a baseline signal is received from the stylus 100 to determine the signal strength at a known distance between the eraser antenna 110 and the digitizer screen 102. In some instances, this may be accomplished through a configuration utility stored and executed on the computing device 202 such as by causing the stylus to be oriented orthogonally to, and in contact with, the digitizer screen in order to determine the baseline signal strength. In some instances, when in this orientation, the eraser antenna 110 will be at its minimum distance away from the digitizer screen and therefore the erase signal will be at its maximum strength. This maximum strength erase signal may serve as the baseline against future erase signals that are compared to determine the erase signal attenuation. This process may be repeated at intervals since the maximum strength erase signal may also be dependent upon the battery voltage within the stylus, which may slightly change over time as the battery discharges and/or is charged.

At block 404, the computing device, through the digitizer screen, detects the location at which the stylus touches the digitizer screen. The digitizer screen may have conductive lines that form a grid on the digitizer screen. As the stylus touches the digitizer screen, a signal is generated that can be correlated with an x and y position on the screen.

At block 406, the computing device, through the digitizer screen, detects the contact area of the stylus on the digitizer screen. This may be performed simultaneously, or substantially simultaneously, as detecting the location of touch of the stylus on the digitizer screen. The contact area is dependent upon the geometry of the stylus, the tilt angle of the stylus, and in some implementations, the rotation of the stylus, and the force at which the stylus is pressed against the digitizer screen. The contact area may further include a path that the stylus takes across the digitizer screen. That is, the contact area may be determined based upon the combined physical contact area of the stylus as it moves across the digitizer screen.

At block 408, the computing device receives an erase signal from the eraser antenna. Of course, the erase signal may be received prior to detecting the contact location or the contact surface area. That is, the computing device may detect the erase signal prior to contact between the digital eraser and the digitizer screen and may be prepare to perform an erase function.

At block 410, the computing device may optionally determine the signal strength being emitted from the eraser antenna of the stylus. The determined signal strength may be compared against the baseline signal to determine the change in distance between the eraser antenna and the digitizer screen. The change in distance may be used to determine the tilt or in some cases, the rotation, of the stylus. Attenuation of the erase signal may additionally be increased through obstacles in the path of the erase signal. Accordingly, obstacles may be built into the tail end such that the erase signal is further attenuated when the stylus is tilted at predetermined angles.

At block 412, the computing device adjusts the response to the stylus contact based upon the contact area, the signal strength, or both. That is, the computing device may adjust its response to the stylus contact, such as by varying the width of the erase stroke, the strength of the erase stroke, or some other response or combination of responses.

Figure 5A:
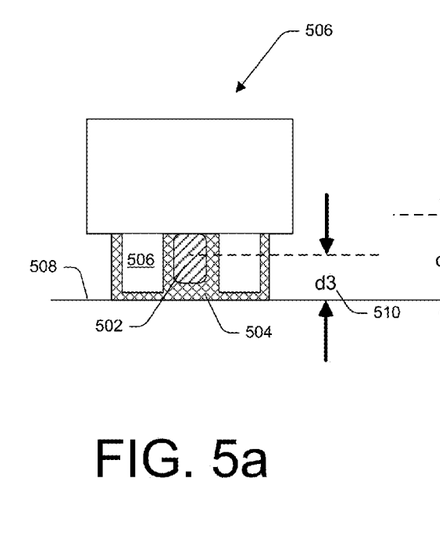
FIG. 5a is an elevational simplified schematic diagram of a tail end of a stylus.
Figure 5B:
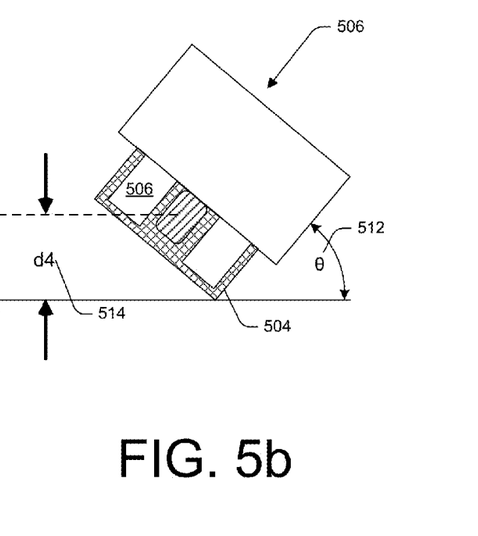
FIG. 5b is an elevational simplified schematic diagram of the tail end of the stylus of FIG. 5a illustrating the stylus at a tilt angle with respect to the digitizing surface.

With reference to FIGS. 5a and 5b, another example of a digital eraser 506 is illustrated. The illustrated implementation shows a simplified cross-sectional schematic view of a digital eraser that is symmetrical about its axis. An eraser antenna 502 is housed with a cover 504. The cover 504 defines one or more air gaps 506 that may surround the eraser antenna 502. When the stylus is oriented perpendicular to the digitizer screen 508, the eraser antenna 502 emits an erase signal from a location that is spaced a distance d3 510 away from the digitizer screen. The erase signal need only penetrate through the cover 504 and will be emitted at its maximum signal strength when in this orientation.

However, when the stylus is tilted at an angle θ 512 as shown in FIG. 5b, the erase signal is emitted from a location that is spaced a distance d4 514 from the digitizer screen 508. The distance d4 514 is greater than the distance d3 which results in erase signal attenuation. Moreover, because of the configuration of the cover 504 and the air gap 506, the erase signal is further attenuated as it encounters additional barriers from the interface between the cover 504 and the air gap 506.

The cover 504 may be configured with any number of air gaps 506 spaced in a variety of locations and patterns. Moreover, the air gap 506 may contain another material, other than air such as alternative gasses or solids, to cause further attenuation of the erase signal.

Figure 6A:
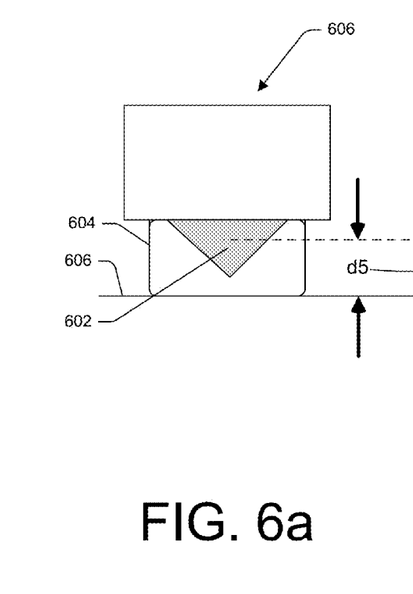
FIG. 6a is an elevational simplified schematic diagram of a tail end of a stylus.
Figure 6B:
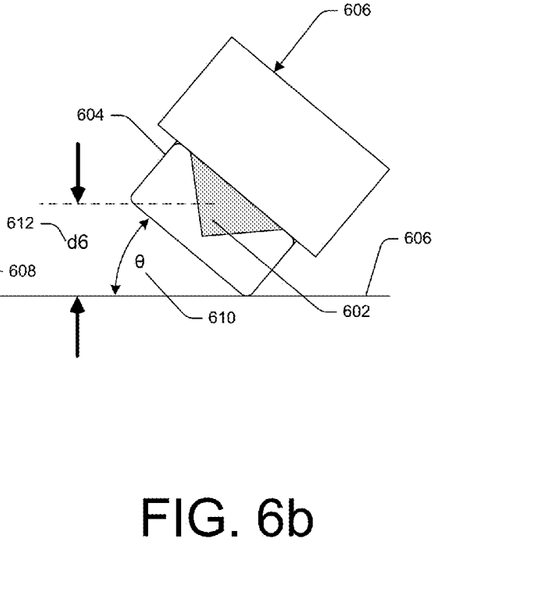
FIG. 6b is an elevational simplified schematic diagram of the tail end of the stylus of FIG. 6a illustrating the stylus at a tilt angle with respect to the digitizing surface.

With reference to FIGS. 6a and 6b, another example of a digital eraser 606 is shown. An eraser antenna 602 may be configured in any shape and orientation within the tail end 606 of the stylus. As illustrated, the eraser antenna 602 may be shaped as a triangle, a cone, or a pyramid. A cover 604 houses the eraser antenna 602 and may be made of any suitable material. In some instances, the cover is formed of a conductive material, such as a conductive rubber, for example, to simulate the feel of a pencil eraser on paper, or may be formed of a dielectric material, such as rubber or plastic. The dielectric material may be any suitable insulative material that can be polarized by an applied electric field.

When the stylus is oriented orthogonally to the digitizer screen 606 as in FIG. 6a, the erase signal is emitted from a location that is spaced from the digitizer screen 606 a distance d5 608. As shown in FIG. 6b, when the stylus is tilted at an angle θ 610, the erase signal is emitted from a location that is spaced from the digitizer screen 606 a distance of d6 612. Of course, the distance d6 612 is a function of the cover 604 geometry and the position of the eraser antenna 602 within the cover 604. In many instances, the distance d6 612 is greater than the distance d5 608, thus when the stylus is tilted at an angle θ 610, the erase signal is attenuated and the computing device can detect the signal attenuation as a result of the stylus being tilted. Moreover, the computing device can estimate the angle of tilt θ 610 based upon the signal attenuation when compared with the baseline signal.

Figure 7A:
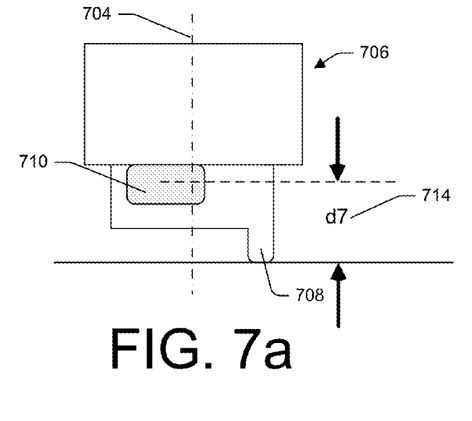
FIG. 7a is an elevational simplified schematic diagram of the tail end of a stylus.
Figure 7B:
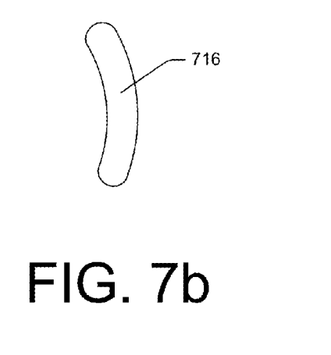

With reference to FIGS. 7a and 7b, another example of a digital eraser 706 is illustrated in which the cover 702 is asymmetrical about a longitudinal axis 704 of the stylus. For example, a protrusion 708 may extend from one or more portions of the cover 702 that affects the distance from the eraser antenna 710 to the digitizer screen 712. As shown, the erase signal is emitted from a location that is spaced a distance of d7 714 from the digitizer screen 712.

As further illustrated in FIG. 7a, the eraser antenna 710 may be located off-center with respect to the longitudinal axis 704 of the stylus, thus allowing for distinct signal profiles depending on the tilt and rotation of the stylus. In a substantially orthogonal orientation to the digitizer screen 712, as shown, the surface contact area 716 between the cover 702 and the digitizer screen 712 is limited to the shape of the end of the protrusion and is illustrated in FIG. 7b.

Based upon the erase signal strength and/or the surface contact area 714, the computing device may initiate an erase function having the size and shape of the surface area contact 714. However, if the stylus is rotated such that a smaller portion of the protrusion 708 contacts the digitizer screen 712, the erase function may have a correspondingly smaller size and shape, or may alter the opacity of (e.g., the strength of) the erase function.

Figure 7C:
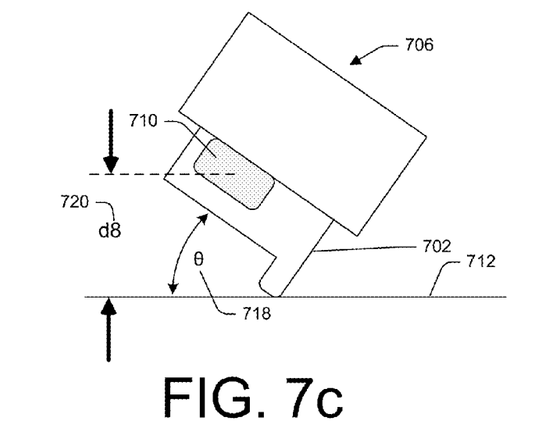

With reference to FIG. 7c, the digital eraser 706 is tilted at an angle θ 718 with respect to the digitizer screen 712. In this orientation, the erase signal is emitted from a location that is spaced a distance d8 720 from the digitizer screen 712. In this configuration, the distance d8 720 is greater than the distance d7 714 and the erase signal will therefore be attenuated as compared to the signal strength when the stylus is in the orientation shown in FIG. 7a. The computing device may receive data that indicates the geometry of the digital eraser 706 and may thus determine that the stylus is tilted at approximately angle θ 718 based upon the erase signal strength.

Figure 7D:
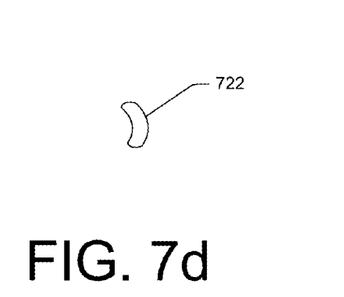
FIG. 7d is an illustration of the surface contact between the digital eraser and the digitizer screen of FIG. 7c.

With additional reference to FIG. 7d, when the stylus is tilted at an angle θ 718, the surface contact area 722 will be substantially smaller than the surface contact area 716 as shown in FIG. 7b. Accordingly, the computing device may initiate an erase function that is much finer than if there were a larger surface contact area between the cover 708 and the digitizer screen 712. For example, where the cover 712 is only contacting the digitizer screen 712 along and edge thereof, the erase function may include a reduced opacity and/or a reduced size of the erase area. Of course, other functions may be assigned based upon the signal strength and the surface contact area.

Figure 7E:
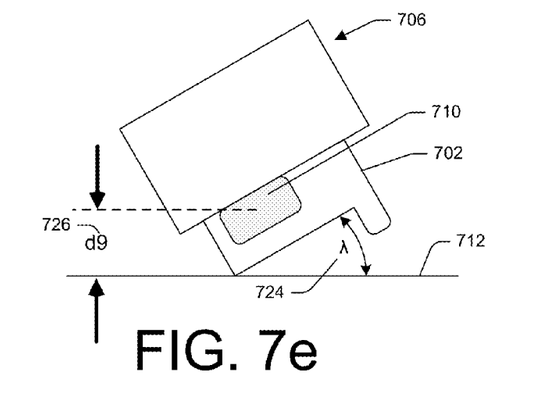

With reference to FIG. 7e, when the stylus is tilted at an angle λ 724, the erase signal is emitted from a location that is spaced a distance d9 726 from the digitizer screen 712. Depending on the configuration of the cover 702 and the position of the eraser antenna 710, the distance d9 726 may be less than the distance d7 714 when in an orthogonal orientation as shown in FIG. 7a. As such, the erase signal strength may be stronger when oriented as in FIG. 7e than when oriented as in FIG. 7a. The geometry of the cover 702 and the location of the eraser antenna 710 may be selected to provide any desirable erase signal strength based upon the tilt and rotation of the stylus.

Figure 7F:
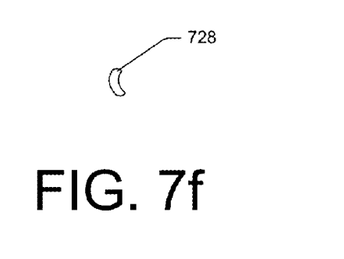
FIG. 7f is an illustration of the surface contact between the digital eraser and the digitizer screen of FIG. 7d.

With reference to FIG. 7f, when the digital eraser 706 is oriented as in FIG. 7e, the surface contact area 728 is relatively small since only a portion of the edge of the cover 702 is in contact with the digitizer screen 712. In response, the computing device may initiate an erase function having a correspondingly small erase area and/or a reduce opacity when compared to an erase function initiated as a result of greater surface area contact between the cover 702 and the digitizer screen 712.

Figure 8A:
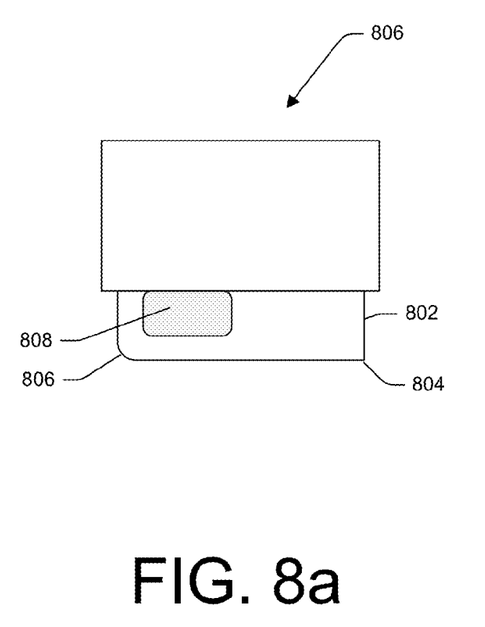
FIG. 8a is an elevational simplified schematic diagram of the tail end of a stylus.

With reference to FIG. 8a, a digital eraser 806 may have a cover 802 that is asymmetrical about a longitudinal axis of the stylus. The cover 802 may further be configured with a sharp edge 804 and/or a rounded edge 806. The difference in edge configurations may provide distinct surface contact areas with the digitizer screen and may be used by the computing device to initiate erase functions with differing parameters (i.e., size, shape, and/or opacity).

An eraser antenna 808 may be located off-center within the cover 802. When configured this way, as the stylus is held at a constant angle with respect to the digitizer screen, rotating the stylus will result in the erase signal strength varying as the eraser antenna 808 moves closer to, or further away from, the digitizer screen. The computing device may thus initiate erase functions having various parameters as a result of the rotation of the stylus, in addition to the tilt of the stylus.

While the computing device may be able to detect the approximate tilt and/or the approximate rotation of the stylus, the detection need not be highly accurate. In other words, it may not be important to determine whether the stylus is tilted at 20 degrees versus 22 degrees. The computing device may be able to detect when the tilt of the stylus is within a predetermined range. For example, the tilt detection may be highly granular, and may only be able to determine the approximate tilt of the stylus within 30 degree increments. That is, the computing device may be able to determine when the stylus is tilted at an angle between zero and thirty degrees, or between thirty and sixty degrees, or between sixty and ninety degrees. The increment of detection may be every ten degrees, or twenty degrees, or forty-five degrees, or some other desirable increment.

Figure 8B:
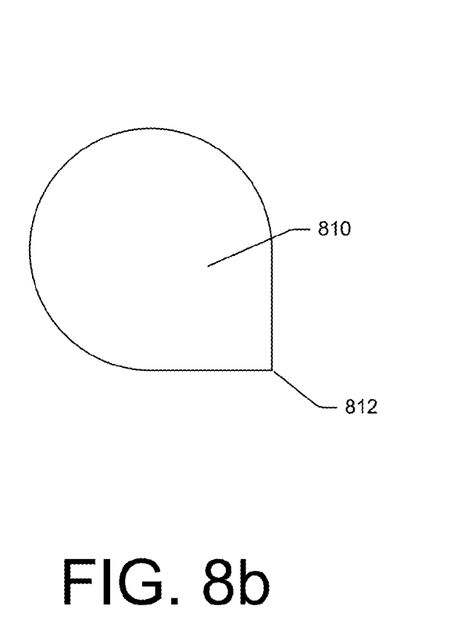

FIG. 8b illustrates the surface contact area 810 of the cover 802 geometry of FIG. 8a. As shown, the surface contact area 810 can vary from a maximum of the tear drop shape, as illustrated, to a minimum of a point contact when only the sharp tip 812 of the cover 802 contacts the digitizer screen. In use, as the stylus is rotated about its longitudinal axis, the surface contact area may change as well as the strength of the erase signal depending on the rotational orientation of the stylus.

Figure 9A:
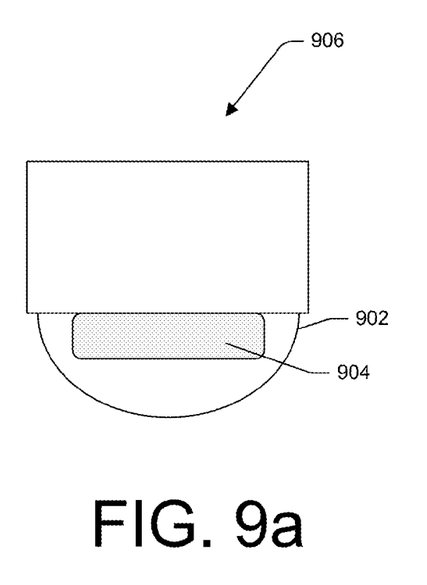
FIG. 9a is an elevational simplified schematic diagram of the tail end of a stylus.

With reference to FIG. 9a, a digital eraser 906 may have a cover 902 that is generally hemispherical and may house an eraser antenna 904. The cover 902 may be formed of a material having a relatively high elasticity such that it is deformable against the digitizer screen when an erasing force is applied. Consequently, as the cover 902 elastically deforms in response to an erasing force, the distance between the eraser antenna 904 and the digitizer screen changes, thus changing the strength of the erase signal emitted from the eraser antenna 904. The change in signal strength due to elastic deformation of the cover 902 may be used to infer a strength of an erasing function.

Figure 9B:
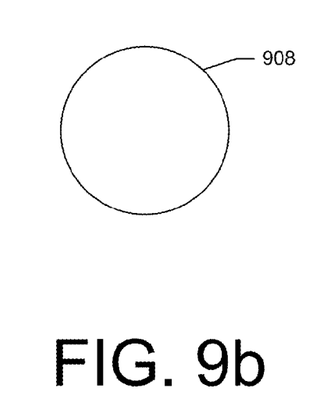

FIG. 9b illustrates the surface contact area 908 between the cover 902 and the digitizer screen as an erasing force is applied to the stylus to force the cover 902 against the digitizer screen. As the cover 902 deforms, the surface contact area 908 increases in a circular shape. The size of the surface contact area 908 may likewise be used to infer an erasing pressure and therefore be used to determine the parameters of the erasing function.

Figure 10A:
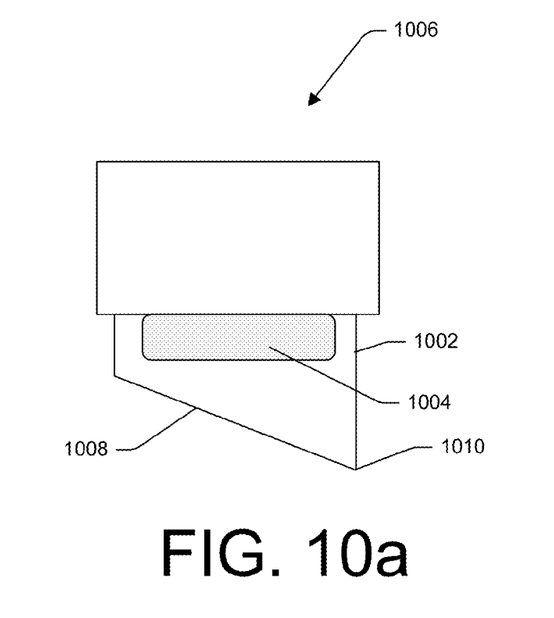
FIG. 10a is an elevational simplified schematic diagram of the tail end of a stylus.

With reference to FIG. 10a, a digital eraser 1006 may have a cover 1002 that is asymmetrical and houses an eraser antenna 1004. The illustrated cover may be generally circular when viewed from the top (e.g., and end view of the stylus) of the cover; however, it may define an oblique surface 1008. The cover 1002 may have an acute edge 1010 that defines an acute angle between the longitudinal axis of the stylus and the oblique surface 1008. As such, multiple surface contact area profiles may be used to vary the surface contact with the digitizer screen to result in functions having differing parameters.

For example, when the digital eraser 1006 is held in a substantially orthogonal orientation with respect to the digitizer screen, only the acute edge 1010 of the cover 1002 will make contact with the digitizer screen. An erase function may be initiated that includes a high degree of precision (e.g., fineness) to erase a path of adjacent pixels as the cover 1002 moves across the digitizer screen. Alternatively, or additionally, the erase function may vary the opacity of the erase function to only partially remove the information from the digitizer screen.

Figure 10B:
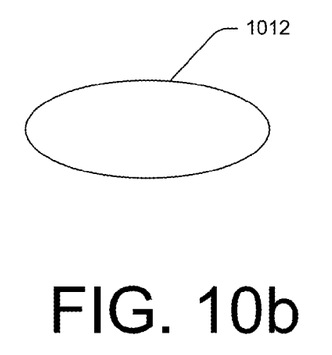

When the digital eraser 1006 is tilted such that the oblique surface 1008 makes surface contact with the digitizer screen, the surface contact area 1012 may resemble an ellipse, as shown in FIG. 10b. The surface contact area 1012 may then be detected by the digitizer screen and an erase function may be initiated having a relatively large erase area, that is, pixels associated with the erase area may be erased in a relatively wide swath as the cover 1002 moves across the digitizer screen.

In some instances, the configuration of the components illustrated in FIG. 10a may be a digital marker. That is, the eraser antenna 1004 may output a signal indicating that the computing device should interpret the wireless and touch signals from the digital eraser 1006 as an ink input. For example, the digital eraser 1006 could be used as a marker to input either fine strokes when using the acute edge 1010 or broad strokes when using the oblique surface 1008 to contact the digitizer screen. By changing the erase signal to a inking signal, or by a setting within the computing device that interprets the erase signal as an inking signal, the tail end of the stylus can be used to input information into the computing device.

Example Clauses

In some implementations, a system for erasing digital ink comprises a stylus having a tail end, wherein the tail end comprises an eraser antenna configured to emit an erase signal, and a cover that houses the eraser antenna and a computing device having a touch-screen. The computing device further comprises a signal strength meter, the signal strength meter configured to detect a strength of the erase signal and a microcontroller. In some examples, the microcontroller may be configured to determine, based upon the strength of the erase signal, a tilt of the stylus; and initiate an erase function, wherein at least one of a width, an area, or an opacity of the erase function is based at least in part upon the tilt of the stylus.

In some examples, the cover is asymmetrical about a longitudinal axis of the stylus. The cover may be configured to position the eraser antenna at a first distance from the touch-screen when the stylus is tilted to a first position and to position the eraser antenna at a second distance from the touch-screen when the stylus is tilted to a second position.

The cover may be configured to position the eraser antenna at a first distance from the touch-screen when the stylus is rotated to a first orientation about a longitudinal axis of the stylus and to further position the eraser antenna at a second distance from the touch-screen when the stylus is rotated to a second orientation about the longitudinal axis of the stylus. The width, the area, or the opacity of the erase function may be based at least in part upon a surface area of the cover contacting the touch-screen.

In some examples, the eraser antenna is located off-center with respect to a longitudinal axis of the stylus.

According to other examples, a stylus for a computing device includes an elongate barrel, the elongate hollow barrel having a longitudinal axis and further having a writing end and a tail end. The tail end may include an eraser antenna and a cover configured to house the eraser antenna, wherein the cover is asymmetrical about the longitudinal axis.

The cover may be configured to locate the eraser antenna a first distance away from a digitizer screen when the stylus is rotated about the longitudinal axis to a first orientation and to locate the eraser antenna a second distance away from the digitizer screen when the stylus is rotated about the longitudinal axis to a second orientation.

In some instances, the cover defines an internal air gap configured to attenuate an erase signal emitted from the eraser antenna. The cover may be formed of a resilient dielectric material.

In some examples, the cover may be configured to locate the eraser antenna a first distance away from a digitizer screen when the stylus is tilted at a first angle and to locate the eraser antenna a second distance away from the digitizer screen when the stylus is tilted at a second angle.

The eraser antenna may be located off-center with respect to the longitudinal axis. In other examples, the cover may define a protrusion extending from the tail end in a direction generally parallel to the longitudinal axis.

In use, a method for erasing digital ink may include receiving an erase signal from a digital eraser; determining a signal strength associated with the erase signal; and initiating an erase function that includes one or more of a shape, a size, or an opacity based at least in part upon the signal strength associated with the erase signal.

A contact area between the digital eraser and the digitizer screen may be detected and the erase function is based at least in part upon the contact area between the digital eraser and the digitizer screen.

A tilt of the digital eraser with respect to the digitizer screen may be determined based upon one or more of the signal strength or the contact area. The erase function may be based in part upon the tilt of the digital eraser with respect to the digitizer screen.

The signal strength or the contact area may be used to determine the rotation of the digital eraser with respect to the digitizer screen. The erase function may be based at least in part upon the rotation of the digital eraser.

In some instances, the erase signal may be changed to an inking signal. In which case, the computer device may receive the inking signal, determine the strength of the inking signal, and initiate an inking function that includes one or more of a shape, a size, or an opacity based at least in part upon a signal strength associated with the inking signal.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A system for erasing digital ink, comprising:
a stylus having a tail end, wherein the tail end comprises an eraser antenna configured to emit an erase signal, and a cover that houses the eraser antenna; and
a computing device having a touch-screen, the computing device further comprising:
a signal strength meter configured to detect a strength of the erase signal based on determining a change in distance between the eraser antenna and the touch-screen during surface contact of the tail end of the stylus and the touch-screen; and
a microcontroller configured to:
determine, based upon the strength of the erase signal, a tilt of the stylus; and
initiate an erase function, wherein at least one of a width, an area, or an opacity of the erase function is based at least in part upon the tilt of the stylus.

2. The system as in claim 1, wherein the cover is asymmetrical about a longitudinal axis of the stylus.

3. The system as in claim 1, wherein the cover is configured to position the eraser antenna at a first distance from the touch-screen when the stylus is tilted to a first position and to position the eraser antenna at a second distance from the touch-screen when the stylus is tilted to a second position.

4. The system as in claim 1, wherein the cover is configured to position the eraser antenna at a first distance from the touch-screen when the stylus is rotated to a first orientation about a longitudinal axis of the stylus and to further position the eraser antenna at a second distance from the touch-screen when the stylus is rotated to a second orientation about the longitudinal axis of the stylus.

5. The system as in claim 1, wherein at least one of the width, the area, or the opacity of the erase function is based at least in part upon a surface area of the cover contacting the touch-screen.

6. The system as in claim 1, wherein the eraser antenna is located off-center with respect to a longitudinal axis of the stylus.

7. A stylus for a computing device, the stylus comprising:
an elongate barrel, the elongated hollow barrel having a longitudinal axis and further having a writing end and a tail end, the tail end comprising:
an eraser antenna configured to emit an erase signal; and
a cover configured to house the eraser antenna, wherein the cover is asymmetrical about the longitudinal axis,
wherein the cover is configured to contact a digitizer screen of a computing device such that an erase function is initiated based on the contact and a strength of the erase signal, the strength of the erase signal being determined based on a change in distance between the eraser antenna and the digitizer screen during surface contact of the tail end of the stylus and the digitizer screen.

8. The stylus as in claim 7, wherein the cover is configured to locate the eraser antenna a first distance away from a digitizer screen when the stylus is rotated about the longitudinal axis to a first orientation and to locate the eraser antenna a second distance away from the digitizer screen when the stylus is rotated about the longitudinal axis to a second orientation.

9. The stylus as in claim 7, wherein the cover defines an internal air gap configured to attenuate the erase signal emitted from the eraser antenna.

10. The stylus as in claim 7, wherein the cover is formed of a resilient dielectric material.

11. The stylus as in claim 7, wherein the cover is configured to locate the eraser antenna a first distance away from the digitizer screen when the stylus is tilted at a first angle and to locate the eraser antenna a second distance away from the digitizer screen when the stylus is tilted at a second angle.

12. The stylus as in claim 7, wherein the eraser antenna is located off-center with respect to the longitudinal axis.

13. The stylus as in claim 7, wherein the cover defines a protrusion extending from the tail end in a direction generally parallel to the longitudinal axis.

14. A method for erasing digital ink, comprising:
receiving, at a computing device, an erase signal from a digital eraser of a stylus;
determining, at the computing device, a signal strength associated with the erase signal based on determining a change in distance between the digital eraser and a digitizer screen during surface contact of a tail end of the stylus and the digitizer screen; and
initiating, at the computing device, an erase function that includes one or more of a shape, a size, or an opacity based at least in part upon the signal strength associated with the erase signal.

15. The method as in claim 14, further comprising determining a contact area between the digital eraser and the digitizer screen, wherein initiating the erase function is based at least in part upon the contact area between the digital eraser and the digitizer screen.

16. The method as in claim 15, further comprising determining, based upon one or more of the signal strength or the contact area, a tilt of the digital eraser with respect to the digitizer screen.

17. The method as in claim 16, wherein the erase function is based at least in part upon the tilt of the digital eraser with respect to the digitizer screen.

18. The method as in claim 15, further comprising determining, based upon one or more of the signal strength or the contact area, a rotation of the digital eraser with respect to the digitizer screen.

19. The method as in claim 18, wherein the erase function is based at least in part upon the rotation of the digital eraser.

20. The method as in claim 14, further comprising:
changing the erase signal to an inking signal;
receiving the inking signal;
determining a signal strength associated with the inking signal; and
initiating an inking function that includes one or more of a shape, a size, or an opacity based at least in part upon a signal strength associated with the inking signal.

* * * * *